Figure 1:
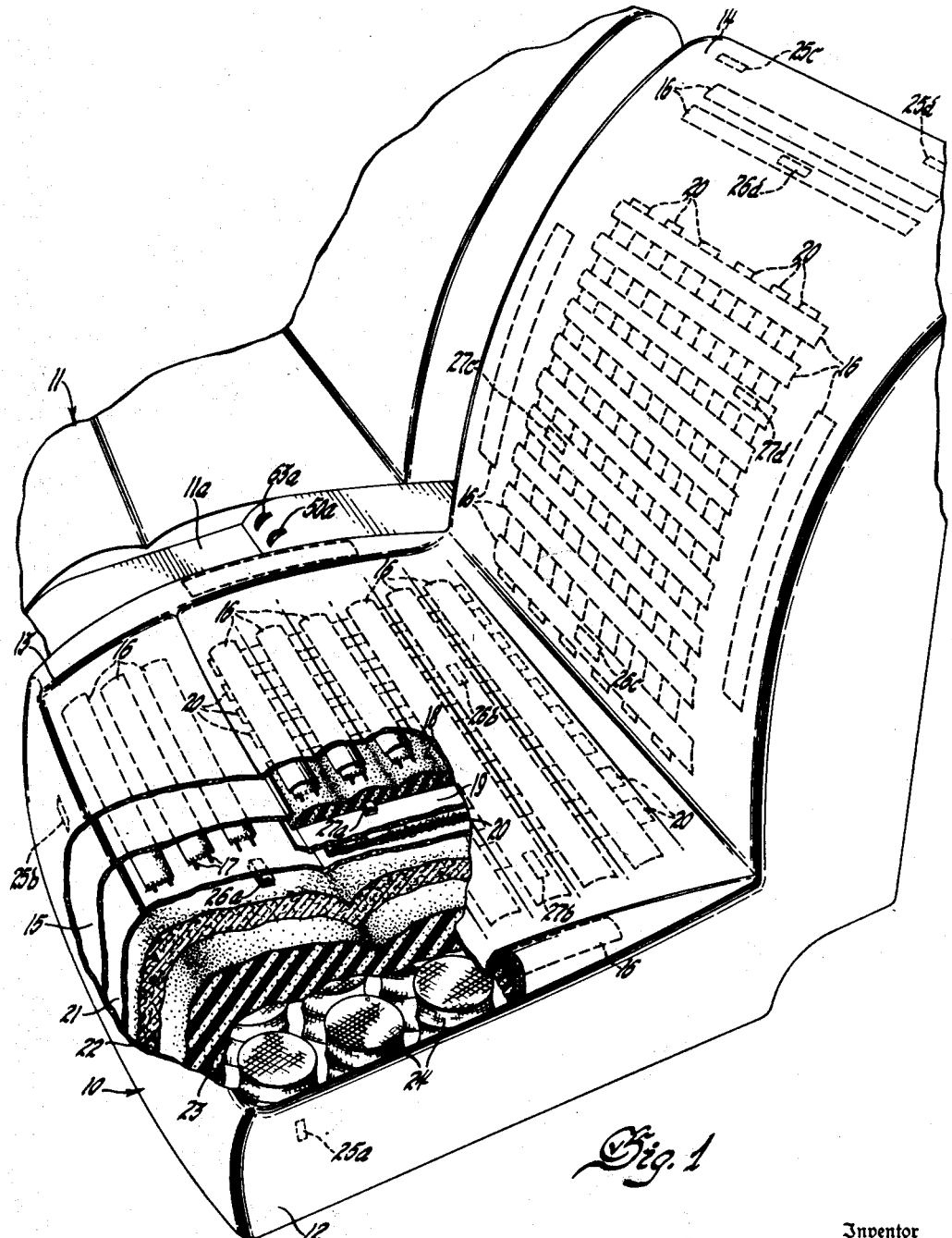

Jan. 4, 1955

R. L. BALLARD 2,698,893

AUTOMOBILE SEAT HEATER

Filed April 30, 1951

3 Sheets-Sheet 1

Inventor
Robert L. Ballard

By Willits, Helwig & Baillio
Attorneys

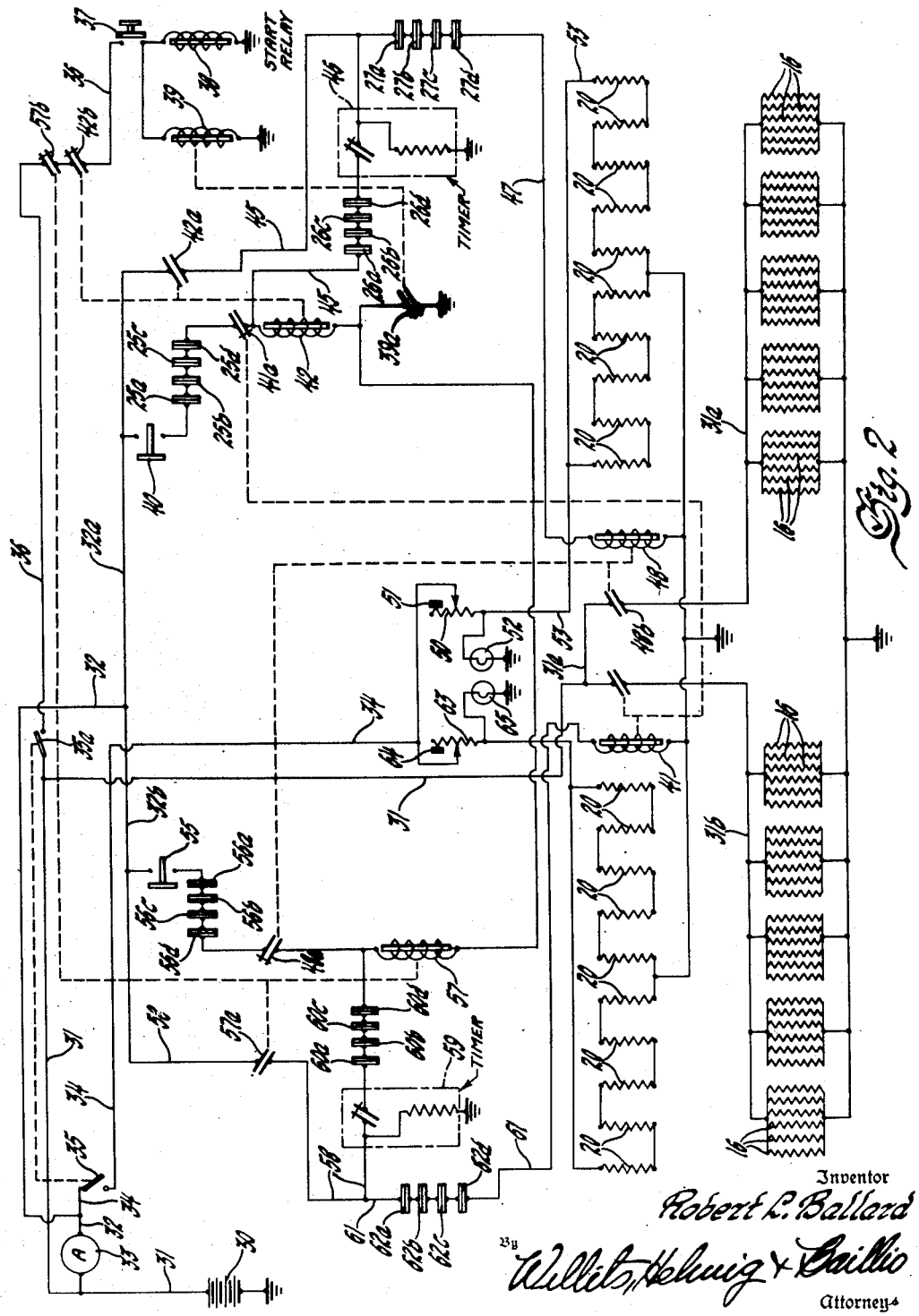

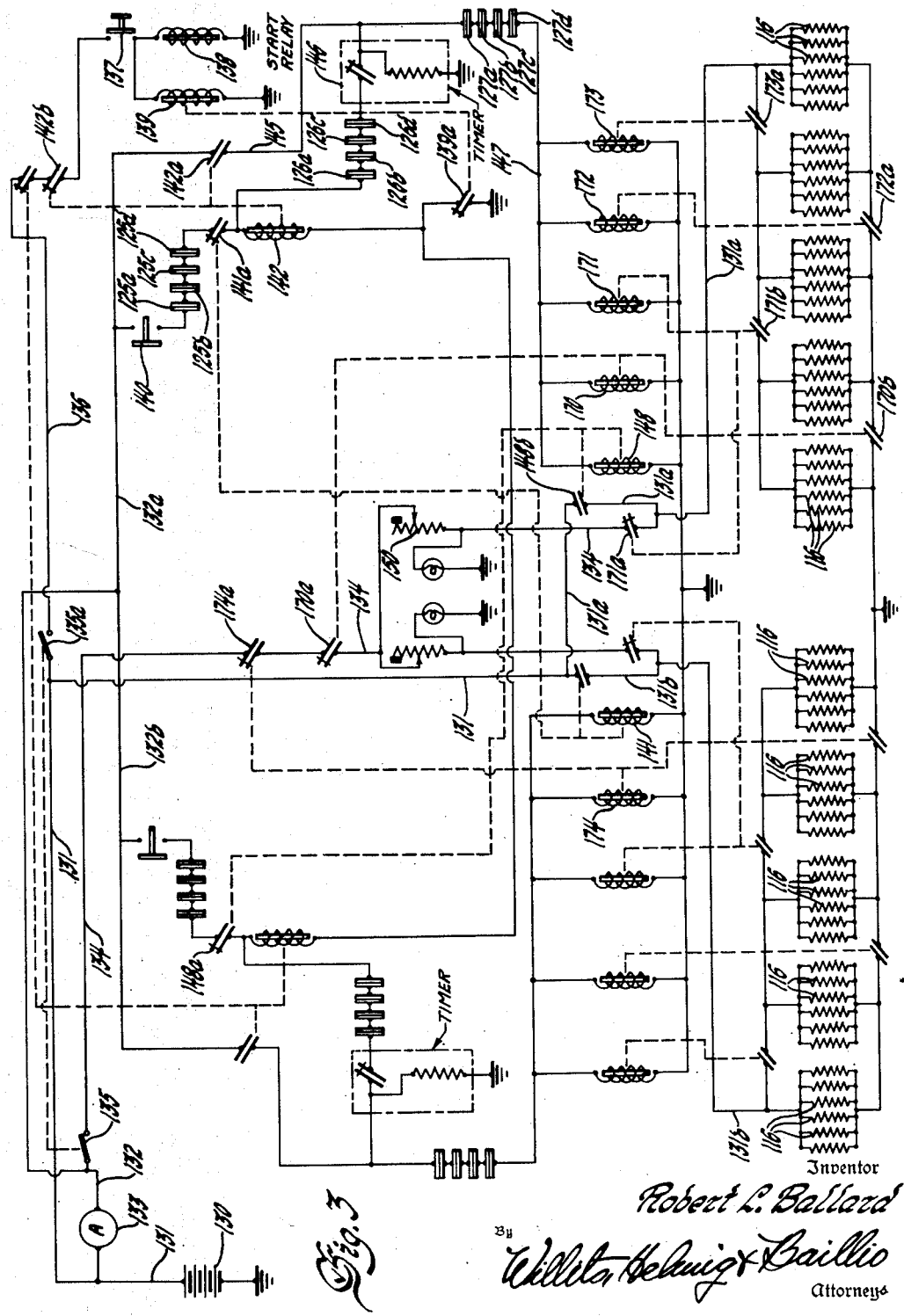

United States Patent Office 2,698,893
Patented Jan. 4, 1955

2,698,893

AUTOMOBILE SEAT HEATER

Robert L. Ballard, Detroit, Mich., assignor to General Motors Corporation, Detroit, Mich., a corporation of Delaware Application April 30, 1951, Serial No. 223,797

21 Claims. (Cl. 219—20)

This invention relates to an automobile seat heater, and more particularly to an automobile seat heater having rapid heating means for heating the seat before the driver or a passenger enters the automobile and slow heating means for providing low steady heat.

One feature of the invention is that it provides a novel automobile seat heater; another feature of the invention is that it provides an automobile seat heater including heating means embedded in an automobile seat closely adjacent the seating surfaces thereof, and means connected to the heating means for energizing the heating means to heat the seating surfaces; a further feature of the invention is that fast heat control means are provided for heating the seating surfaces before the driver or a passenger enters the automobile, and slow heat control means are provided for heating the seating surfaces slowly; still another feature of the invention is that the fast heat control means includes door operated switch means for temporarily energizing at least a portion of the heating means with a voltage in excess of the voltage at which said heating means are adapted to operate continuously; yet a further feature of the invention is that automatically operable cutout means are connected to the fast heat control means for cutting off the heat after a short period; an additional feature of the invention is that it includes means for disabling the fast heating means when the automobile starting circuit is energized and means for disabling said starting circuit when the fast heat control means is energized; yet another feature is that it provides separate control means for the driver's seat and for a passenger's seat, and means are provided interconnecting these separate fast heat control means for disabling one of the control means when the other control means is energized; and still a further feature of the invention is that means are provided for connecting a plurality of elements of the heating means is parallel to provide for fast heating and for connecting said elements in series to provide for slow heating.

Other features and advantages of the invention will be apparent from the following description and from the drawings, in which:

Fig. 1 is a fragmentary perspective view of a portion of an automobile seat having the seat heater embedded therein, portions being broken away to show underlying construction; Fig. 2 is a schematic diagram of the seat heater shown in Fig. 1 and the operating circuits therefor; and Fig. 3 is a schematic diagram of a modified form of seat heater and the operating circuits therefor.

Referring now more particularly to the drawings, in Fig. 1 an automobile seat is illustrated as comprising a driver's seat designated generally as 10 and a front passenger seat designated generally as 11, said seats being separated by a control panel 11a. Since the seats are similar insofar as the heating means is concerned, only the driver's seat will be described in detail. The driver's seat comprises a seat cushion mounted in a seat frame 12 and having a cushion surface 13, and a seat back having a reclining surface 14, the cushion surface 13 and reclining surface 14 together forming a seating surface. A portion of the cushion surface 13 is shown broken away to illustrate the underlying structure. The seating surface may be formed of leather, under which is a light weight glass cloth 15. Beneath the glass cloth 15 and closely adjacent the surface 13 are a plurality of heating elements 16 which may comprise elongated conductive rubber strips having spaced leads 17 adapted to be connected across a source of voltage. When so connected current flows between the wires and the resistance of the conductive rubber causes heat to be generated. The elements 16 may be obtained commercially under the name of "Uskon," these elements being adapted to operate continuously at a predetermined voltage (3 volts in the case of the elements above referred to).

Beneath the heating elements 16 is a pleated foam rubber layer 18, this layer terminating short of the forward seat portion or bolster roll. Beneath the foam rubber padding is a heavy glass cloth 19 which also terminates short of the bolster roll, and beneath this heavy cloth are a plurality of heating elements 20 extending in a direction from front to rear of the seat cushion and terminating short of the bolster roll. While the heating elements 20 are also quite closely adjacent the heating surface 13 so that heat therefrom warms said surface, these heating elements are spaced farther from the seating surface than are the heating elements 16.

Beneath the heating elements 20 is another heavy weight glass cloth 21. Below this cloth is a layer of fibrous glass padding 22 which rests upon a relatively thick layer of foam rubber padding 23, which in turn is mounted upon cloth covered springs 24 which form the base of the seat within the seat frame 12.

The construction of the seat back is similar to the seat cushion construction above described, heating elements 16 and 20 also being embedded in said seat back. Thermostats 25a and 25b are mounted in the seat cushion and thermostats 25c and 25d are mounted in the seat back, all of these thermostats being located remotely from any of the heating elements. Thermostats 26a and 26b are mounted in the seat cushion and thermostats 26c and 26d are mounted in the seat back, these thermostats being mounted adjacent the heating elements; and thermostats 27a and 27b are mounted in the seat cushion and thermostats 27c and 27d are mounted in the seat back, these thermostats also being adjacent the heating elements.

Fig. 2 shows schematically the heating arrangement of Fig. 1 and the operating circuits therefor. Referring to Fig. 2, the electrical apparatus of the automobile is powered by a battery 30, which may be of 12 volt capacity, and which has one terminal connected to ground and the other terminal connected to a lead 31 which provides a current source directly from the battery. This lead has a branch 31a which feeds the driver's seat and a branch 31b which feeds the passenger's seat. A lead 32 branches from the lead 31 and incorporates the automobile ammeter 33. Another lead 34 branches from the lead 32 and incorporates an ignition switch 35 having ganged therewith a second switch 35a in the automobile starting circuit. A portion of the starting circuit is shown as comprising a lead 36 branching from the direct lead 31 and including ignition switch 35a, a starter switch 37 and a starter relay 38. A relay coil 39 is connected in parallel with the starter relay 38.

The ammeter lead 32 has a branch 32a feeding the driver's seat fast heat control circuits and a branch 32b feeding the passenger's seat fast heat control circuits. The function of the fast heat control circuits is to connect the heating elements 16 to the battery for a brief period. Connected to the lead 32a is a door-operated switch 40, which may be of conventional type and may if desired be similar in principle to the switch disclosed in Batcheller Patent No. 2,338,481. In series with the switch 40 are the four thermostats 25a–d, these thermostats being arranged to open at about 50 degrees F., and as earlier noted, being located remote from the heating elements 16 and 20. A normally closed switch 41a, a relay coil 42 and a normally closed switch 39a are connected in series with the thermostats 25a–d, one terminal of the switch 39a being connected to ground.

The relay coil 42 operates a normally open switch 42a and a normally closed switch 42b. The switch 42a is in a holding circuit which is generally in parallel with the door switch 40, the thermostats 25a–d and the switch 41a for holding relay coil 42 energized after any of elements 40, 25 or 41a open. The normally closed switch 42b is in the lead 36 in the starting circuit above described. Upon closure of door operated switch 40, current flows from the ammeter lead 32 to ground through lead 32a, switch 40, thermostats 25a–d, switch 41a, relay coil 42 and normally closed switch 39a operated by relay coil 39. Obviously, if the temperature at the location of any one of the thermostats 25a–d is above 50 degrees F., this circuit will be open. Similarly, if the starting circuit is energized by closure of the ignition switch 35a and starting switch 37, the relay coil 39 will open switch 39a, and the fast heat control circuit cannot be energized.

However, if all the parts are in the positions illustrated in Fig. 2 and switch 40 is then closed, the fast heat control circuit will be energized, closing switch 42a and opening switch 42b. Switch 42b opens the starter circuit so that the automobile cannot be started while the fast heat cycle is in process. Inasmuch as the fast heat circuit draws about 150 amperes and inasmuch as the starter circuit may draw in excess of 200 amperes, mutual lockout means are provided by means of the switches 39a and 42b to prevent excessive current drain by disabling the fast heat control circuit when the starting circuit is energized and disabling the starting circuit when the fast heat control circuit is energized.

Energization of relay coil 42 will also close switch 42a, thereby establishing a holding circuit around door jamb switch 40 and thermostat 25a–d so that the fast heat control circuit will remain energized despite the fact that the door may be closed, opening switch 40, and despite the fact that the temperature may rise above 50 degrees F. so that one or more of the thermostats 25a–d opens. This holding circuit is formed by a lead 45 which incorporates switch 42a and which incorporates in series arrangement with switch 42a, a timer 46 and thermostats 26a–d. Thermostats 26a–d are located at points adjacent the heating elements 16 as shown in Fig. 1, and these thermostats may be set to open at 120 degrees F. When the temperature adjacent one or more of the thermostats 26a–d has risen to 120 degrees, one or more of said thermostats will open and break the holding circuit for the relay coil 42.

In the normal operation of the apparatus the thermostats 26a–d will control the termination of operation of the fast heat control circuit. As a safety measure, the timer 46 is inserted in series with thermostats 26a–d. This timer is set to open the holding circuit after a predetermined time lapse, as 5 to 7 seconds. In very cold weather it might happen that the timer controls termination of operation of the fast heat circuit, but the principal function of the timer is to act as a safety in the event the thermostats 26a–d fail to operate within a short period of time. It is undesirable to draw the heavy fast heating current from the battery 30 for more than a few seconds.

Another lead 47 branches from the lead 45 at a point between the switch 42a and the timer 46. Lead 47 incorporates in series a plurality of thermostats 27a–d, and a relay coil 48, which has one side connected to ground. Thermostats 27a–d comprise another safety device and may be set to open at about 180 degrees F. These thermostats are positioned in very close association with the heating elements 16 and 20, as shown in Fig. 1, and will open when the temperature reaches 180 degrees in the event other portions of the fast heating control circuit fail to function to break the circuit.

The relay coil 48 operates a normally closed switch 48a, which is in the timing portion of the fast heat control circuit for the passenger seat, as will be hereinafter described. A normally open switch 48b operated by the relay coil 48 is in the branch lead 31a and serves to feed the driver's seat heating elements 16 with current directly from the battery 30 through the leads 31 and 31a. The heating elements 16 are connected in parallel groups of six elements each, and these parallel groups are themselves connected in parallel between the lead 31a and ground.

A manually operable control for the slow or steady heat circuit for the driver's seat includes a variable resistor 50 having its movable tap connected to the lead 34 which extends through the ignition switch 35 and ammeter 33 to the battery 30. The movable tap is operated by a control knob 50a (Fig. 1). At the open end of the variable resistor 50 is an insulated block 51 for providing an "off" position for the movable tap. The other end of the resistor 50 is connected to an indicating lamp 52 which will glow with a brilliance which varies in accordance with the amount of voltage being applied across the heating elements 20, the lamp being in parallel with said elements. The resistor 50 is connected through a lead 53 to the heating elements 20, these elements being arranged in series-connected groups of 5, and the other side of the series-connected groups being grounded.

The circuits for controlling the passenger seat are similar to the circuits above described. A door jamb switch 55 is connected in a series circuit extending from lead 32b and including said switch 55, a plurality of thermostats 56a–d (which may be set to operate at about 50 degrees F.), the normally closed switch 48a operated by relay coil 48, a relay coil 57, and the normally closed switch 39a to ground. The relay coil 57 operates a normally open switch 57a in a holding circuit in parallel with the circuit including switch 55, thermostats 56a–d and switch 48a. A normally closed switch 57b operated by coil 57 is connected in series in the automobile starting circuit. The above mentioned holding circuit comprises a lead 58 incorporating in series the switch 57a, a timer 59, and thermostats 60a–d, which may be set to open at about 120 degrees F. A lead 61 branches from the lead 58 and includes in series thermostats 62a–d and relay coil 41.

The slow heat control circuit for the passenger's seat includes a variable resistor 63 having an insulated terminal 64 and having its movable tap connected to the lead 34. The movable tap is operated by a control knob 63a (Fig. 1). An indicating lamp 65 is connected to the resistor 63 and said resistor is connected to the heating elements 20 which are connected in two parallel groups of 5 in series between said resistor and ground.

In the operation of the heating system, in the event the door on the driver's side is opened, switch 40 will be closed in conventional manner, closing a circuit through relay coil 42 to ground, assuming, of course, that the temperature in the automobile is below 50 degrees F. so that none of the thermostats 25a–d is open.

In the event the fast heat control circuit on the passenger's seat is energized, relay coil 41 (which is in the fast heat control circuit for the passenger seat) will have opened switch 41a, thereby disabling the heating circuit on the driver's side while the heating circuit on the passenger's side is being operated. It is also to be noted that if the starting circuit is energized switch 39a will be open so that both said fast heat control circuits will be disabled while the starting circuit is energized.

Assuming that the temperature is below 50 degrees and that neither the starting circuit nor the fast heat control circuit on the passenger's side is energized, closure of door jamb switch 40 will close the circuit through relay coil 42, opening switch 42b to disable the starting circuit and closing switch 42a to establish a holding circuit around switch 40, thermostats 25a–d, and switch 41a. Current to hold relay coil 42 energized will then flow through lead 45 and through the timer 46 and thermostats 26a–d. Upon operation of the timer or upon opening of any one of thermostats 26a–d, this holding circuit will be broken and relay 42 will be released.

So long as switch 42a is closed, current also flows through lead 47 to ground, this circuit including thermostats 27a–d and relay coil 48. So long as the temperature of the heating elements remains below 180 degrees, the opening point of thermostats 27a–d, relay 48 will be operated so that switch 48a will be opened, disabling the fast heat control circuit on the passenger's side. Simultaneous closure of switch 48b will feed heavy current directly from the battery through leads 31 and 31a to the parallel connected heating elements 16. Inasmuch as these heating elements are adapted to operate at 3 volts, they will be over-energized by the battery voltage of 12 volts and will heat up very rapidly to a temperature of 120 degrees F., which will cause one or more of the thermostats 26a–d to open, thus breaking the holding circuit so that switch 42a opens and relay coil 48 is deenergized, opening switch 48b and breaking the direct line from the battery. While the thermostats will normally open in 5 seconds or less, the timer 46 will open the circuit in the event thermostats do not operate after about 5 or 7 seconds. In the event neither the timer nor the thermostats operate to break the circuit, one or more of the thermostats 27a–d will operate to break the circuit to the relay coil 48 when the temperature reaches 180 degrees F.

In order to operate the slow heat circuit the movable tap of potentiometer 50 is moved by the control 50a away from the "off" position to any desired position along the resistor 50. Since the heating elements 20 are connected in series in groups of 5, even the full battery voltage of 12 volts will under-energize these heating elements so that the slow heat circuit may be closed for long periods of time without any danger of over-heating or damaging the elements 20. Even in the event the automobile generator increases the voltage up to 14 or 15 volts, the heating elements 20 will not be over-energized.

Fig. 3 shows a modified circuit wherein the same elements are used for fast heat as for slow heat, the elements being connected in a parallel arrangement for fast heat and in a series arrangement for slow heat. Portions of the circuit which are similar to the circuit of Fig. 2 will only be briefly described, and similar parts will be designated by reference characters 100 higher than those used in Fig. 2.

In Fig. 3, the heating elements 116 are connected in parallel groups of 6 elements, and switch means are provided for connecting these groups selectively in parallel with each other for fast heating or in series with each other for slow heating. A source of voltage comprises a battery 130 having one end grounded and the other end connected to a lead 131 which may supply current directly from the battery to the heating elements 116, this lead having a branch 131a for feeding the heating elements in the driver's seat and a branch 131b for feeding the heating elements in the passenger's seat.

Another lead 132 feeds the driver's fast heat control circuit through a branch 132a, and feeds the passenger's fast heat control circuit through a branch 132b. The lead 132 includes an ammeter 133. Another lead 134 extends from the lead 132 and incorporates an ignition switch 135 having a ganged switch portion 135a in a branch lead 136 which comprises the automobile starting circuit and includes a starting switch 137, a starting relay 138, and another relay coil 139 connected in parallel with the starter relay 138. The fast heat control circuit on the driver's side includes, in series arrangement, a door operated switch 140, thermostats 125a–d, a normally closed switch 141a operated by relay coil 141 in the passenger's fast heat control circuit, a relay coil 142 operating a normally open switch 142a in a holding circuit and a normally closed switch 142b in the starting circuit, and a normally closed switch 139a operated by the relay coil 139 in the starting circuit.

The holding circuit comprises a lead 145 incorporating in series a timer 146 and a plurality of thermostats 126a–d arranged to open at about 120 degrees F. A branch lead 147 extending from the lead 145 and having therein a plurality of thermostats 127a–d energizes a plurality of parallel connected relay coils 148, 170, 171, 172, and 173. The relay coil 148 is similar to the relay coil 48 of Fig. 2 and operates a normally closed switch 148a in the fast heat control circuit for the passenger seat and a normally open switch 148b in the lead 131a which feeds the heating elements 116 from the battery.

The relay coil 170 operates a normally closed switch 170a which is in the lead 134 and opens to disable the slow heat control means whenever the fast heat control means is energized. A similar switch 174a is located in the lead 134 in series with the switch 170a. Switch 174a is controlled by a relay coil 174 in the fast heat control circuit for the passenger's seat, and serves to disable the slow heat circuit whenever the fast heat control for the passenger's seat is energized.

Relay coil 170 also operates a normally open switch 170b connected between two of the parallel-connected groups of heating elements.

Relay coil 171 operates a normally closed switch 171a in the lead which feeds the heating elements 116 on the driver's side for the slow heat circuit. Coil 171 also operates a normally open switch 171b connected between two of the parallel-connected groups of heating elements 116. Similarly, relay coils 172 and 173, respectively, operate normally open switches 172a and 173a connected between groups of heating elements.

When the door is opened, closing door jamb switch 140 and energizing the fast heat control means for the driver's seat, relay coils 148, 170, 171, 172 and 173 are energized. The switch 148a operated by relay coil 148 opens to disable the fast heat control circuit on the passenger's side, and the switch 148b closes to feed the heating elements from the battery through the leads 131 and 131a. The switches associated with relay coils 170 to 173 close to connect the heating elements 116 in parallel so that these heating elements are over-energized by the full battery voltage, which is several times the voltage at which said heating elements are adapted to operate, to provide fast seat heating in the manner described in connection with Fig. 2. Simultaneously, switches 170a and 171a open to disable the slow heat circuit.

The slow heating control circuit includes a variable resistor 150 through which current is fed from the battery through the ammeter and ignition switch and leads 134 and 131a to the heating elements 116. However, when the slow heat control circuit is energized the switches 170b, 171b, 172a, and 173a are open as illustrated in Fig. 3, and consequently the five groups of heating elements are connected in series with each other so that said elements are energized with a voltage of the order of the predetermined voltage at which the heating elements are adapted to operate. If the heating elements are adapted to operate at 3 volts and the battery voltage is 12 volts, the heating elements are energized with a voltage lower than said predetermined voltage, and even though the automobile generator increases the voltage of the source, no over-energization of the heating elements will occur.

While I have shown and described two embodiments of my invention, it is subject to many modifications. Changes, therefore, in the construction and arrangement may be made without departing from the spirit and scope of the invention as set forth in the appended claims.

I claim:

1. An automobile seat heater of the character described, including: heating means comprising a plurality of elements embedded in an automobile seat cushion closely adjacent the seat cushion surface thereof and a plurality of elements embedded in the seat back closely adjacent the reclining surface thereof; and means connected to said heating means for energizing said heating means to heat said surfaces, said last mentioned means including door-operated switch means.

2. An automobile seat heater of the character described, including: heating means embedded in an automobile seat closely adjacent the seating surface thereof; fast heat control means connected to said heating means for energizing at least a portion of said heating means to heat said surface rapidly; slow heat control means connected to said heating means for energizing at least a portion of said heating means to heat said surface slowly; and door-operated switch means for operating at least one of said control means.

3. An automobile seat heater of the character described, including: electric heating means embedded in an automobile seat closely adjacent the seating surface thereof, said heating means being adapted to operate at a predetermined voltage; a source of voltage higher than said predetermined voltage; fast heat control means connected between said heating means and said source of voltage for energizing at least a portion of said heating means with a voltage in excess of said predetermined voltage to heat said surface rapidly; and slow heat control means connected between said heating means and said source of voltage for energizing at least a portion of said heating means with a voltage of the order of said predetermined voltage to heat said surface slowly.

4. An automobile seat heater of the character described, including: electric heating means comprising a plurality of elements embedded in an automobile seat cushion and a plurality of elements embedded in the seat back, said elements being adapted to operate at a predetermined voltage; a source voltage several times greater than said predetermined voltage; fast heat control means connected between said heating means and said source of voltage for energizing at least a portion of said heating means with a voltage several times greater than said predetermined voltage to heat the seating surfaces rapidly; door-operated switch means for energizing said control means; and slow heat control means connected between said heating means and said source of voltage for energizing at least a portion of said heating means with a voltage lower than said predetermined voltage to heat said surfaces slowly.

5. An automobile seat heater of the character described, including: electric heating means embedded in an automobile seat, said heating means being adapted to operate at a predetermined voltage; a source of voltage higher than said predetermined voltage; fast heat control means connected between said heating means and said source of voltage for energizing at least a portion of said heating means with a voltage in excess of said predetermined voltage to heat the seating surface rapidly; automatically operable cutout means connected to said control means for cutting off said heat; and slow heat control means connected between said heating means and said source of voltage for energizing at least a portion of said heating means with a voltage of the order of said predetermined voltage to heat said surface slowly.

6. Apparatus of the character claimed in claim 5, wherein said cutout means includes at least one thermostat embedded in said seat.

7. Apparatus of the character claimed in claim 5, wherein said cutout means includes at least one thermostat for disabling said heating means for determining initial energization of said heating means, said thermostat being embedded in said seat and located remotely from said heating means, and at least one thermostat for disabling said heating means for determining the maximum temperature of said heating means, said last mentioned thermostat being embedded in said seat adjacent said heating means.

8. Apparatus of the character claimed in claim 5, wherein said cutout means includes a plurality of thermostats for disabling said heating means for determining initial energization of said heating means, said thermostats being embedded in said seat at points remote from said heating means, a plurality of thermostats for disabling said heating means for determining the maximum temperature of said heating means, said last mentioned thermostats being embedded in said seat adjacent said heating means, and a timer for disabling said control means.

9. An automobile seat heater of the character described, including: electric heating means embedded in an automobile seat closely adjacent the seating surface thereof, said heating means being adapted to operate at a predetermined voltage; a source of voltage higher than said predetermined voltage; fast heat control means connected between said heating means and said source of voltage for energizing at least a portion of said heating means with a voltage in excess of said predetermined voltage to heat said surface rapidly; a slow heat control means connected between said heating means and said source of voltage for energizing at least a portion of said heating means with a voltage of the order of said predetermined voltage to heat said surface slowly; and means interconnecting said fast and slow heat control means for disabling said slow heat control means whenever said fast heat control means is energized.

10. Apparatus of the character described, including: heating means embedded in an automobile seat; control means connected to said heating means for energizing said heating means to heat the seating surface; a circuit for starting said automobile; and means for disabling said heating means when said starting circuit is energized.

11. Apparatus of the character described, including: heating means embedded in an automobile seat; control means connected to said heating means for energizing said heating means to heat the seating surface; a circuit for starting said automobile; and means for disabling said starting circuit when said heating means is energized.

12. Apparatus of the character described, including: electric heating means embedded in an automobile seat, said heating means being adapted to operate at a predetermined voltage; a source of voltage higher than said predetermined voltage; fast heat control means connected between said heating means and said source of voltage for energizing at least a portion of said heating means with a voltage in excess of said predetermined voltage to heat the seating surface rapidly; a circuit for starting said automobile; means for disabling said fast heat control means when said starting circuit is energized; and means for disabling said starting circuit when said fast heat control means is energized.

13. An automobile seat heater of the character described, including: first heating means embedded in the driver's seat of an automobile; second heating means embedded in the passenger's seat; first control means connected to said first heating means for energizing said first heating means to heat the surface of said driver's seat; second control means connected to said heating means for energizing said second heating means to heat the surface of said passenger's seat; and means interconnecting said first and second control means for disabling one of said heating means when the other of said heating means is energized.

14. An automobile seat heater of the character described, including: first electric heating means embedded in the driver's seat of an automobile; second electric heating means embedded in the front passenger's seat, each of said heating means being adapted to operate at a predetermined voltage; a source of voltage higher than said predetermined voltage; first and second fast heat control means connected between said respective first and second heating means and said source of voltage for energizing at least a portion of said respective first and second heating means with a voltage in excess of said predetermined voltage to heat said respective seats rapidly; first and second slow heat control means connected between said respective first and second heating means and said source of voltage for energizing at least a portion of said respective first and second heating means with a voltage of the order of said predetermined voltage to heat said respective seats slowly; and means interconnecting said first and second fast heat control means for disabling one of said last mentioned control means when the other of said last mentioned control means is energized.

15. An automobile seat heater of the character described, including: first electric heating means embedded in the driver's seat of an automobile; second electric heating means embedded in the front passenger's seat, each of said heating means being adapted to operate at a predetermined voltage; a source of voltage higher than said predetermined voltage; first and second fast heat control means connected between said respective first and second heating means and said source of voltage for energizing at least a portion of said respective first and second heating means with a voltage in excess of said predetermined voltage to heat said respective seats rapidly; first and second slow heat control means connected between said respective first and second heating means and said source of voltage for energizing at least a portion of said respective first and second heating means with a voltage of the order of said predetermined voltage to heat said respective seats slowly; means interconnecting said first and second fast heat control means for disabling one of said last mentioned control means when the other of said last mentioned control means is energized; a circuit for starting said automobile; means for disabling said first and second fast heat control means when said starting circuit is energized; and means for disabling said starting circuit when either said first or second fast heat control means is energized.

16. An automobile seat heater of the character described, including: heating means comprising a plurality of parallel connected electric heating elements embedded in an automobile seat closely adjacent the seating surface thereof and a plurality of series connected electric heating elements embedded in said seat, each of said elements being adapted to operate at a predetermined voltage; a source of voltage higher than said predetermined voltage; door switch operated fast heat control means connected between said parallel connected elements and said source of voltage for energizing said parallel connected elements with a voltage in excess of said predetermined voltage to heat said surface rapidly; and slow heat control means connected between said series connected heating elemnts and said source of voltage for energizing each of said series connected elements with a voltage of the order of said predetermined voltage to heat said surface slowly.

17. An automobile seat heater of the character described, including: heating means comprising a plurality of parallel connected electric heating elements embedded in an automobile seat closely adjacent the seating surface thereof and a plurality of series connected electric heating elements embedded in said seat farther from said surface than said series connected elements, each of said elements being adapted to operate at a predetermined voltage; a source of voltage higher than said predetermined voltage; door switch operated fast heat control means connected between said parallel connected elements and said source of voltage for energizing said parallel connected elements with a voltage in excess of said predetermined voltage to heat said surface rapidly; automatically operable cutout means connected to said control means for cutting off said heat, said cutout means including at least one thermostat for disabling said control means for determining initial energization of said heating means, said thermostat being embedded in said seat and located remotely from said heating means, and at least one thermostat for disabling said control means for determining the maximum temperature of said heating means, said last mentioned thermostat being embedded in said seat adjacent said heating means; slow heat control means connected between said series connected heating elements and said source of voltage for energizing each of said series connected elements with a voltage of the order of said predetermined voltage to heat said surface slowly; a circuit for starting said automobile; means for disabling said fast heat control means when said starting circuit is energized; and means for disabling said starting circuit when said fast heat control means is energized.

18. An automobile seat heater of the character described, including: heating means comprising a plurality of electric heating elements embedded in an automobile seat closely adjacent the seating surface thereof, each of said elements being adapted to operate at a predetermined voltage, groups of said elements normally being connected in a series arrangement; a source of voltage several times as high as said predetermined voltage; door switch operated fast heat control means connected between said elements and said source of voltage, said control means including a circuit for connecting a plurality of said groups of elements in parallel to energize said parallel connected groups of elements with a voltage several times said predetermined voltage to heat said surface rapidly; slow heat control means connected between said heating means and said source of voltage for energizing said normal arrangement of series connected groups of elements with a voltage of the order of said predetermined voltage to heat said surface slowly; and means interconnecting said fast and slow heat control means for disabling said slow heat control means whenever said fast heat control means is energized.

19. Apparatus of the character described, including: heating means embedded in a vehicle seat closely adjacent the seating surface thereof; control means connected to said heating means for energizing said heating means; a circuit for starting said vehicle; and means for disabling said heating means when said starting circuit is energized.

20. A vehicle seat heater of the character described, including: heating means embedded in a vehicle seat closely adjacent the seating surface thereof; energizing means connected to said heating means; and door-operated switch means for controlling the operation of at least a portion of the heating means.

21. In an automobile having doors on opposite sides and a driver's seat adjacent one door and a passenger's seat adjacent the other door, seat heating apparatus of the character described, including: first heating means comprising a plurality of elements embedded in the driver's seat closely adjacent the seat cushion surface thereof; second heating means comprising a plurality of elements embedded in the passenger's seat closely adjacent the seat cushion surface thereof; circuit means connected to said heating means for energizing said heating means to heat said surfaces; door operated switch means in said circuit connected to said first heating means and operable by the door adjacent the driver's seat; and door operated switch means in said circuit connected to said second heating means and operable by the door adjacent the passenger's seat.

References Cited in the file of this patent

UNITED STATES PATENTS

| | | |
|---|---|---|
| 1,121,979 | Collins | Dec. 22, 1914 |
| 1,344,581 | Cooper | June 22, 1920 |
| 1,447,031 | Newell | Feb. 27, 1923 |
| 2,018,512 | De Laney et al. | Oct. 22, 1935 |
| 2,064,001 | Hilton | Dec. 15, 1936 |
| 2,094,575 | Arostegui | Oct. 5, 1937 |
| 2,262,207 | Scott et al. | Nov. 11, 1941 |
| 2,329,766 | Jacobsen | Sept. 21, 1943 |
| 2,338,481 | Batscheller | Jan. 4, 1944 |
| 2,382,312 | Heinrich | Aug. 14, 1945 |
| 2,402,354 | Waddell | June 18, 1946 |
| 2,433,476 | Munschak | Dec. 30, 1947 |
| 2,451,576 | Pearce | Oct. 19, 1948 |
| 2,559,077 | Johnson et al. | July 3, 1951 |
| 2,575,987 | York et al. | Nov. 20, 1951 |
| 2,587,731 | Irving | Mar. 4, 1952 |

FOREIGN PATENTS

| | | |
|---|---|---|
| 676,003 | France | Nov. 18, 1929 |
| 782,410 | France | Mar. 18, 1935 |
| 586,745 | Great Britain | Mar. 28, 1947 |